United States Patent
Wong et al.

(10) Patent No.: US 8,606,031 B2
(45) Date of Patent: Dec. 10, 2013

(54) FAST, ACCURATE AND EFFICIENT GAUSSIAN FILTER

(75) Inventors: Earl Wong, San Jose, CA (US); Akira Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 12/906,812

(22) Filed: Oct. 18, 2010

(65) Prior Publication Data

US 2012/0092512 A1    Apr. 19, 2012

(51) Int. Cl.
*G06K 9/40*    (2006.01)

(52) U.S. Cl.
USPC .......................................... 382/255; 382/264

(58) Field of Classification Search
USPC ................................................. 382/255, 264
See application file for complete search history.

(56) References Cited

U.S. PATENT DOCUMENTS

| | | | |
|---|---|---|---|
| 6,457,032 | B1 | 9/2002 | Silver |
| 7,711,201 | B2 * | 5/2010 | Wong et al. ................... 382/254 |
| 7,982,734 | B2 * | 7/2011 | Miller ........................... 345/426 |
| 2001/0043722 | A1 | 11/2001 | Wildes et al. |
| 2003/0190090 | A1 * | 10/2003 | Beeman et al. ............... 382/284 |
| 2004/0234159 | A1 | 11/2004 | Wang |
| 2007/0116373 | A1 | 5/2007 | Hwang et al. |
| 2011/0194772 | A1 * | 8/2011 | SanJuan et al. ............... 382/190 |

FOREIGN PATENT DOCUMENTS

| | | |
|---|---|---|
| WO | 2006084150 A3 | 8/2006 |

OTHER PUBLICATIONS

Belt, H. J. W.; Word length reduction for the integral image; Oct. 2008; 15th IEEE International Conference on Image Processing, 2008; pp. 1-4.*

Farabet et al; An FPGA-Based Stream Processor for Embedded Real-Time Vision with Convolutional Networks; Sep. 2009; IEEE 12th International Conference on Computer Vision Workshops, 2009; pp. 1-8.*

Daniel Huttenlocher, "Speeding Up Belief Propagation for Early Vision", MSRI Low Level Vision Workshop Feb. 1, 2005, pp. 1-36.

Paul S. Heckbert, "Fundamentals of Texture Mapping and Image Warping", Jun. 17, 1989, pp. 1-94.

Chaudhury et al., "Fast space-variant elliptical filtering using box splines", IEEE Trans. Image Processing, pp. 1-35.

Yuan et al., "A Simplified Realization for the Gaussian Filter in Surface Metrology", Jan. 31-Feb. 2, 2000, pp. 133-144.

William M. Wells, III, "Efficient Synthesis of Gaussian Filters by Cascaded Uniform Filters", IEEE Transactions on Pattern Analysis and Machine Intelligence, vol. PAMI-8, No. 2, Mar. 1, 1986, pp. 234-239.

Harvey L. Garner, "Theory of Computer Addition and Overflows", IEEE Transactions on computers, vol. c-27, No. 4, Apr. 1978, pp. 297-301.

Jan-Mark Geusebroek, et al., "Fast Anisotropic Gauss Filtering", IEEE Transactions on image processing, vol. 12, No. 8, Aug. 2003.

Andrade-Cetto et al., "Object Recognition" pp. 1-49.

Freeman et al., "The Design and Use of Streerable Filters", IEEE Transactions on Pattern Analasys and Machine Intelligence, vol. 13, No. 9, Sep. 1, 1991, pp. 891-906.

(Continued)

*Primary Examiner* — Utpal Shah
(74) *Attorney, Agent, or Firm* — Haverstock & Owens LLP

(57) ABSTRACT

A fast, accurate and efficient Gaussian filter implements a box filter implementation, applies the central limit theorem and uses an overflow implementation. By combining the box filter, central limit theorem and overflow, the filter is fast, accurate and efficient so that it is able to be implemented in hardware and/or software easily.

21 Claims, 6 Drawing Sheets

(56) References Cited

OTHER PUBLICATIONS

Simoncelli et al., "SteerableWedge Filters for Local Orientation Analysis", IEEE Transactions on Image Processing,5(9), pp. 1-10.

Wojciech Jarosz, "Fast Image Convolutions,", 2001, HTTP://elynxsdk.free.fr/ext-docs/Blur/Fast_box_blur.pdf.

Rau,R.: McClellan, J.H., "Efficient approximation of Gaussian filters,"Signal Processing, IEEE Transactions on, vol. 45, No. 2, pp. 468,471, Feb. 1997.

\* cited by examiner

FAST, ACCURATE AND EFFICIENT GAUSSIAN FILTER

FIELD OF THE INVENTION

The present invention relates to the field of image processing. More specifically, the present invention relates to digital filtering using a fast, accurate and efficient Gaussian filter.

BACKGROUND OF THE INVENTION

Filtering is one of the most common operations in signal and image processing. However, implementing direct convolution operation is able to be very costly. For a 1D signal of length N and a convolution filter of width M, O(MN) operations are needed. This cost becomes increasingly prohibitive as the width of the convolution filter M increases. In the 2D case, the situation becomes even worse for large 2D convolution filters. To address the problems of filtering, Heckbert described a filtering method using repeated integration: Heckbert, "Filtering by Repeated Integration," SIGGRAPH 1986. However, Heckbert's implementation still has several drawbacks to be addressed.

SUMMARY OF THE INVENTION

A fast, accurate and efficient Gaussian filter implements a box filter implementation, applies the central limit theorem and uses an overflow implementation. By combining the box filter, central limit theorem and overflow, the filter is fast, accurate and efficient so that it is able to be implemented in hardware and/or software easily.

In one aspect, a method of implementing a Gaussian filter programmed in a memory in a device comprises implementing a fast convolution with a box filter, repeating the fast convolution to produce a Gaussian-shaped filter and implementing overflow computing to minimize overflow issues. A filtered image is generated by applying the Gaussian filter to an image. The box filter utilizes four corners of a box for computations. The box filter is an arbitrary size. The overflow computing utilizes a modulo table by computing a modulo of original data values and using a modulo result in the fast convolution. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In another aspect, a system for implementing a Gaussian filter programmed in a memory in a device comprises a box filter module for implementing a fast convolution with a box filter, a repeated convolution module for repeating the fast convolution to produce a Gaussian-shaped filter and a overflow computing module for implementing overflow computing to minimize overflow issues. A filtered image is generated by applying the Gaussian filter to an image. The box filter utilizes four corners of a box for computations. The box filter is an arbitrary size. The overflow computing utilizes a modulo table by computing a modulo of original data values and using a modulo result in the fast convolution. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In another aspect, a camera device comprises an image acquisition component for acquiring an image, a processing component for processing the image by implementing a fast convolution with a box filter, repeating the fast convolution to produce a Gaussian-shaped filter and implementing overflow computing to minimize overflow issues and a memory for storing the processed image. A filtered image is generated by applying the Gaussian filter to an image. The box filter utilizes four corners of a box for computations. The box filter is an arbitrary size. The overflow computing utilizes a modulo table by computing a modulo of original data values and using a modulo result in the fast convolution.

In yet another aspect, a method of applying a Gaussian filter to an image programmed in a memory in a device comprises implementing a fast convolution with a box filter, repeating the fast convolution to produce a Gaussian-shaped filter, implementing overflow computing using a modulo operation to minimize overflow issues and generating a filtered image. The box filter utilizes four corners of a box for computations. The box filter is an arbitrary size. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

DETAILED DESCRIPTION OF THE PREFERRED EMBODIMENT

Filtering is one of the most common operations in signal processing, image processing and raster image synthesis. Its applications include, but are not limited to, image enhancement, low pass filtering (blurring), antialiasing for image warping and texture mapping and special effects. The fundamental filtering operation is convolution, in which a weighting function or kernel is passed over the input signal and a weighted average is computed for each output sample.

The most straightforward filtering method is direct convolution, in which a weighted average is computed anew for each output sample. For a discrete signal of length M and a filter of width W, the number of operations required by direct convolution is O(MW). The method is thus very expensive for wide kernels.

When the kernel's shape is independent of position, the filter is called space invariant. Under these conditions, Fourier convolution is able to be used: the signal and kernel are transformed to the frequency domain using a Fast Fourier Transform (FFT), these are multiplied together and an inverse FFT is computed. The cost of this algorithm is O(M log M). Since the cost is independent of kernel width, Fourier convolution is the typically used method for wide, space invariant kernels.

Many applications demand a space variant filter, however, one for which the kernel varies with position. Such applications include nonlinear image warps, texture mapping and depth of field filtering. Since Fourier convolution is inapplicable, direct convolution is usually used for space variant filtering. This is able to be extremely slow for wide kernels, however.

An example from image synthesis will illustrate the problem. In texture mapping, texture images are stored in parametric surface coordinates and projected to the screen by modeling and viewing transformations. For proper antialiasing it is useful to filter the texture area corresponding to each screen pixel. But the transformations are able to cause these texture areas to be arbitrarily large (imagine a pixel containing the horizon of an infinite plane). Using direct convolution, accurate filtering of such pixels is able to be prohibitively expensive. In order to make high quality texture filtering practical alternative techniques are used to perform direct convolution.

Figure 1:
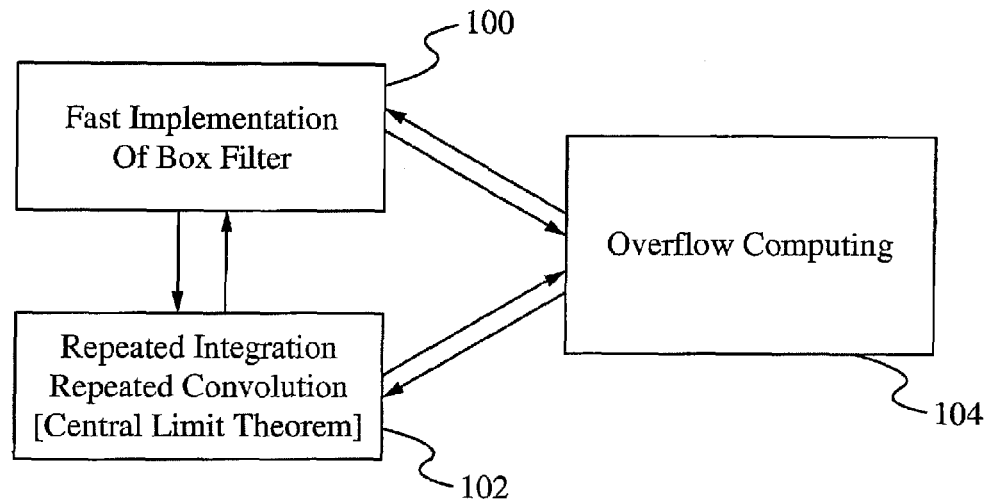
FIG. 1 illustrates a general block diagram of each component of a fast, accurate and efficient Gaussian filter.

To improve image filtering, fast implementation of a box filter is used in conjunction with repeated integration/repeated convolution and overflow computing. Overflow computing has been described in Belt, "Word Length Reduction for the Integral Image," ICIP 2008. FIG. 1 illustrates a general block diagram of each component of the fast, accurate and efficient Gaussian filter. A fast implementation of a box filter 100 is used. Then, repeated integration/repeated convolution 102 is implemented. Additionally, overflow computing 104 assists to ensure an efficient process.

Figure 2:
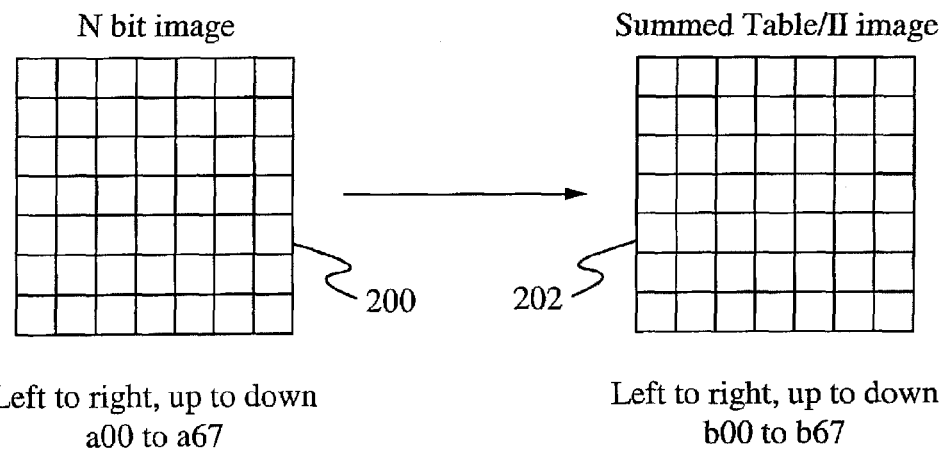
FIG. 2 illustrates a diagram of a direct convolution and a box filter according to some embodiments.

FIG. 2 illustrates a diagram of a direct convolution and a box filter according to some embodiments. An N bit image 200 includes pixels at positions a00 to a67, in a left to right and up to down configuration, for example. A summed table/image 202 includes positions b00 to b67, in a left to right and up to down configuration. The translation from the N bit image 200 to the summed table/image 202 includes calculations such as:

b00=a00
b01=a00+a01
b02=b01+a02
. . .
b10=b00+a10
b20=b10+a20
. . .
b11=b01+a10+a11
b11=b10+a01+a11
. . .

Figure 3:
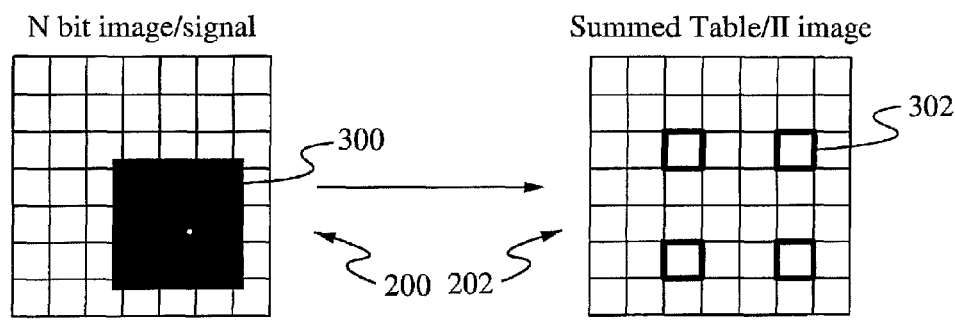
FIG. 3 illustrates a diagram of a direct convolution and a box filter according to some embodiments.

FIG. 3 illustrates a diagram of a direct convolution and a box filter according to some embodiments. A 3×3 box filter convolution is performed for the center pixel in the shaded area 300 of the N bit image 200 by convolving the pixels in the shaded area 300 with [111; 111; 111]. This is also referred to as a direct convolution.

To perform the same 3×3 box filter convolution, the selected elements 302 of the summed table/image 202 are computed: b66+b33−b63−b36. This is referred to as a fast convolution or a fast implementation of a box filter. Although a 3×3 box filter convolution is described, any size box filter is able to be implemented. In some embodiments, the size of the box filter is arbitrarily chosen.

A repeated convolution of any filter with itself eventually produces a Gaussian-shaped filter. Therefore, by repeatedly convolving the same box filter several times, the Gaussian-shaped filter counterpart is able to be realized.

Since hardware overflow requirements are able to make the filtering problematic, overflow computing is implemented.

Figure 4:
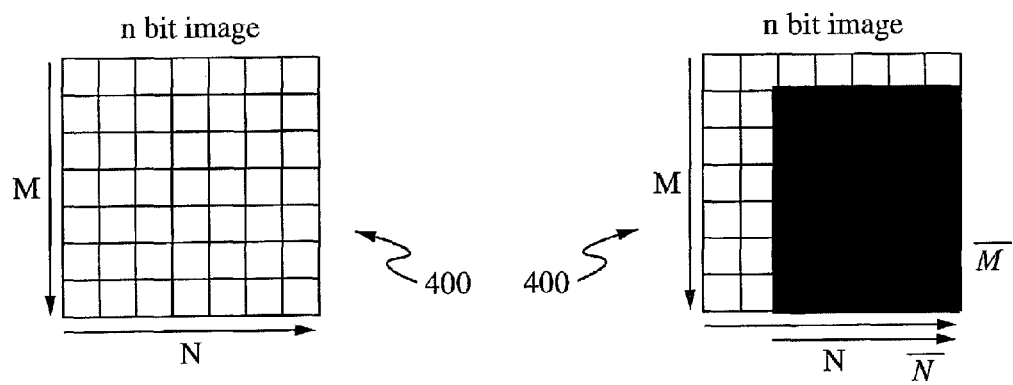
FIG. 4 illustrates a diagram of a direct convolution and a box filter using overflow computing according to some embodiments.

FIG. 4 illustrates a diagram of a direct convolution and a box filter with overflow computing according to some embodiments. In an n bit image 400 with a length of M and a width of N, the largest word length $L_{ii}$ used for integral image is: $(2^{L_x}-1) \geq (2^n-1)MN$ For an n bit image 400 with a length of M and a width of N, and a shaded block area of length $\overline{M}$ and a width $\overline{N}$, the largest word length $L_{ii}^*$ used for the shaded block area integral image is: $(2^{L_x^*}-1) \geq (2^n-1)\overline{MN}$.

Figure 5:
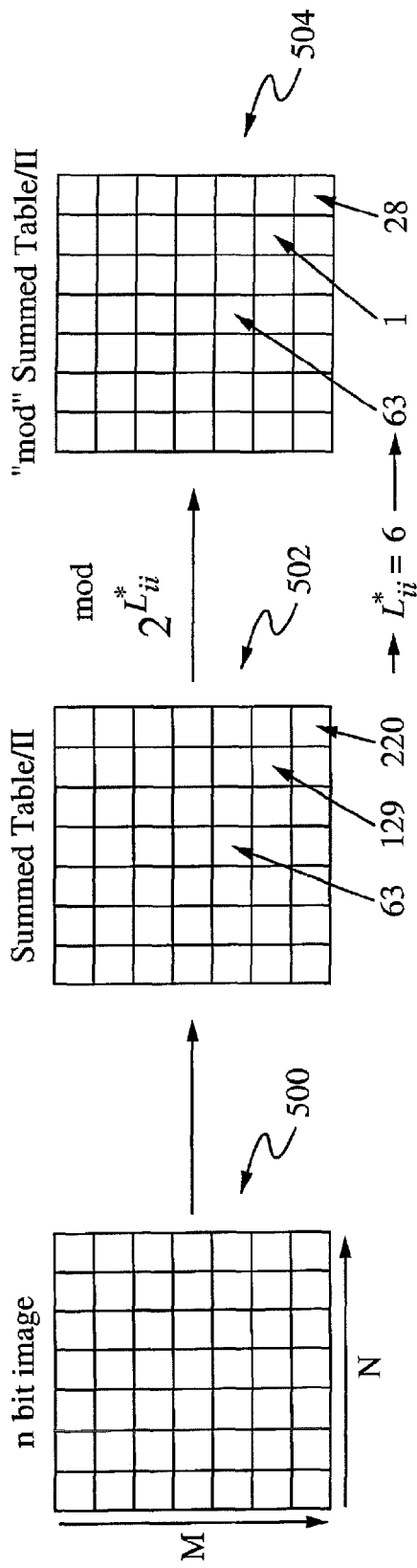
FIG. 5 illustrates a diagram of overflow computing using a modulo sum table according to some embodiments.

FIG. 5 illustrates a diagram of overflow computing using a modulo table according to some embodiments. From an n bit image 500 with a length of M and a width of N, a summed table 502 is able to be generated. Then, a modulo summed table 504 is able to be generated from the summed table 502. The mod is mod $2^{L_x^*}$. In the example in FIG. 5, where $L_{ii}^*=6$, then 63 mod 64 is 63, 129 mod 64 is 1 and 220 mod 64 is 28. The modulo results are then able to be used in further computations.

Figure 6:
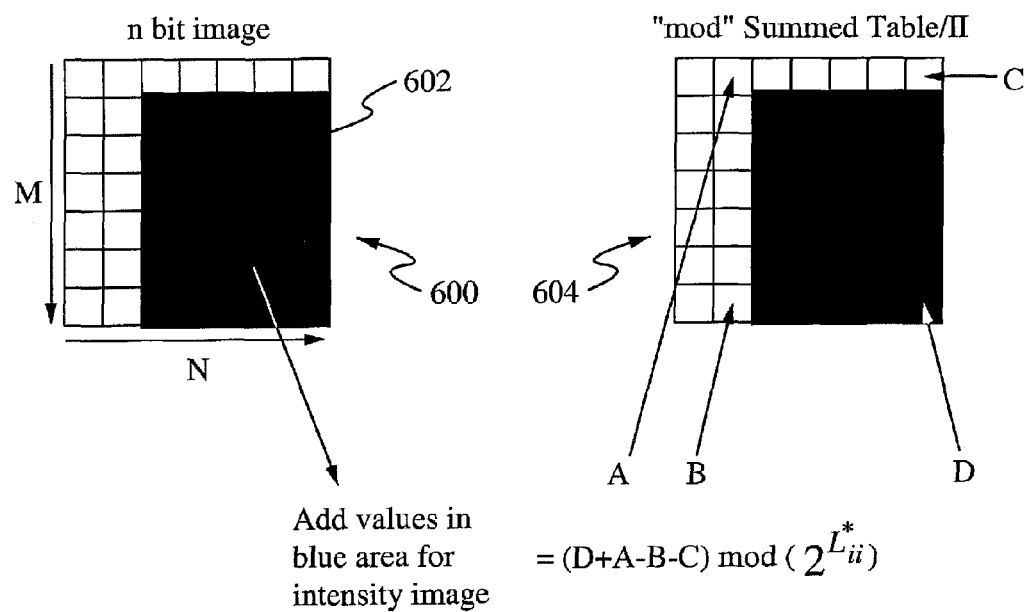
FIG. 6 illustrates a diagram overflow computing using a modulo sum table according to some embodiments.

FIG. 6 illustrates a diagram overflow computing using a modulo sum table according to some embodiments. The sum of the values for a shaded area 602 of the n bit image 600 equal specific points in the modulo sum table 604 such that the equation is:

intensity image=(D+A−B−C) mod $(2^{L_{ii}^*}$. By using the modulo sum table 604, the values to be added are much smaller than the actual values, but the result is still the same, thus avoiding the overflow issue.

Figure 7:
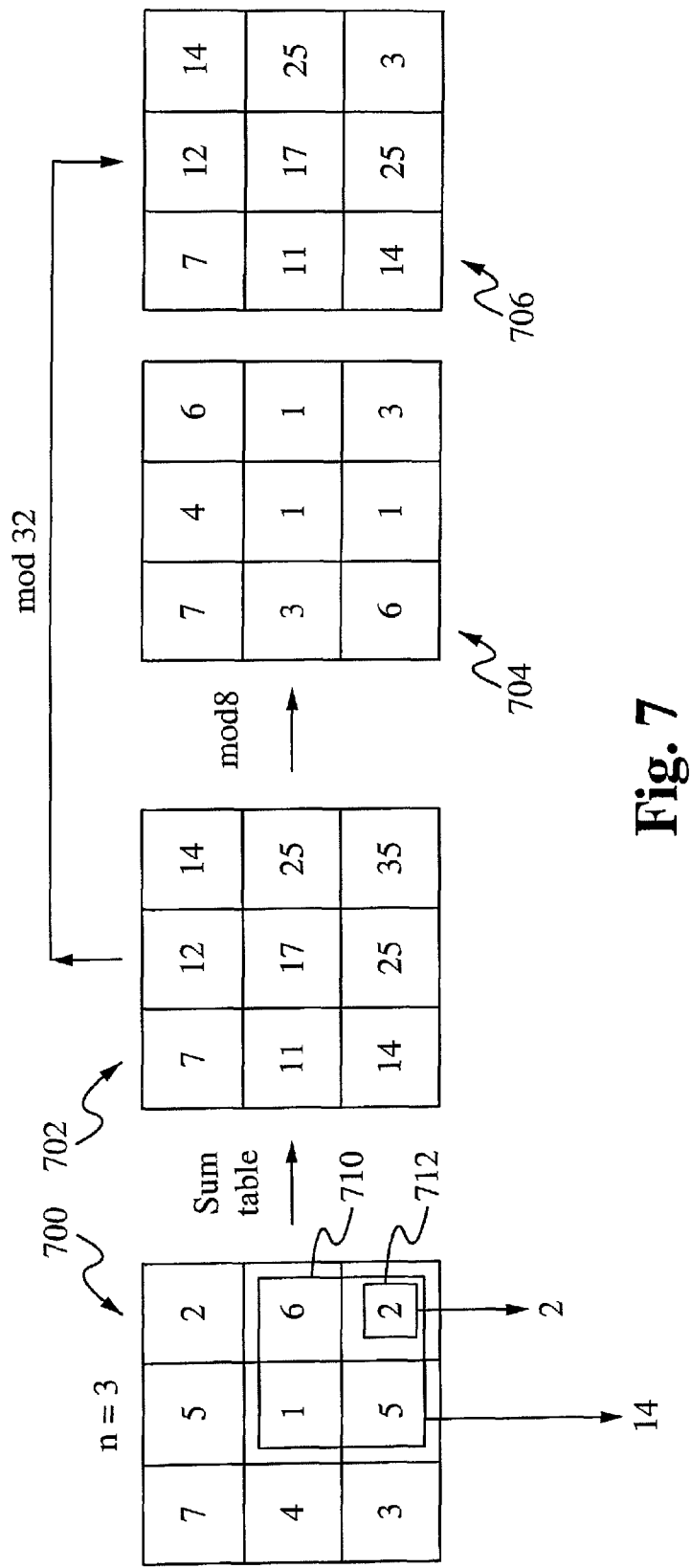
FIG. 7 illustrates an example of filtering according to some embodiments.

FIG. 7 illustrates an example of filtering according to some embodiments. A block 700 where n=3 includes varying pixel values. A sum table 702 is generated using the pixel values as shown. The sum table 702 is then converted using a modulo operation such as mod8 or mod32. With the original block 700, a bottom right value 712 takes on the value of 2. With the sum table 702, the bottom right value 712 is computed as (35+17−25−25)=2. With the mod8 table 704, the bottom right value 712 is computed as (3+1−1−1)mod8=2. With the mod16 table 706, the bottom right value 712 is computed as (3+17−25−25)mod32=2. With the original block 700, the selected block 710 sums to 14. With the sum table 702, the selected block 710 sums to (35+7−14−14)=14. With the mod32 table 706, the selected block 710 sums to (3+7−14−14)mod32=14. To realize a Gaussian filter, the procedure is applied n times since what is true for one pass/application is also true for n passes/applications.

Figure 8:
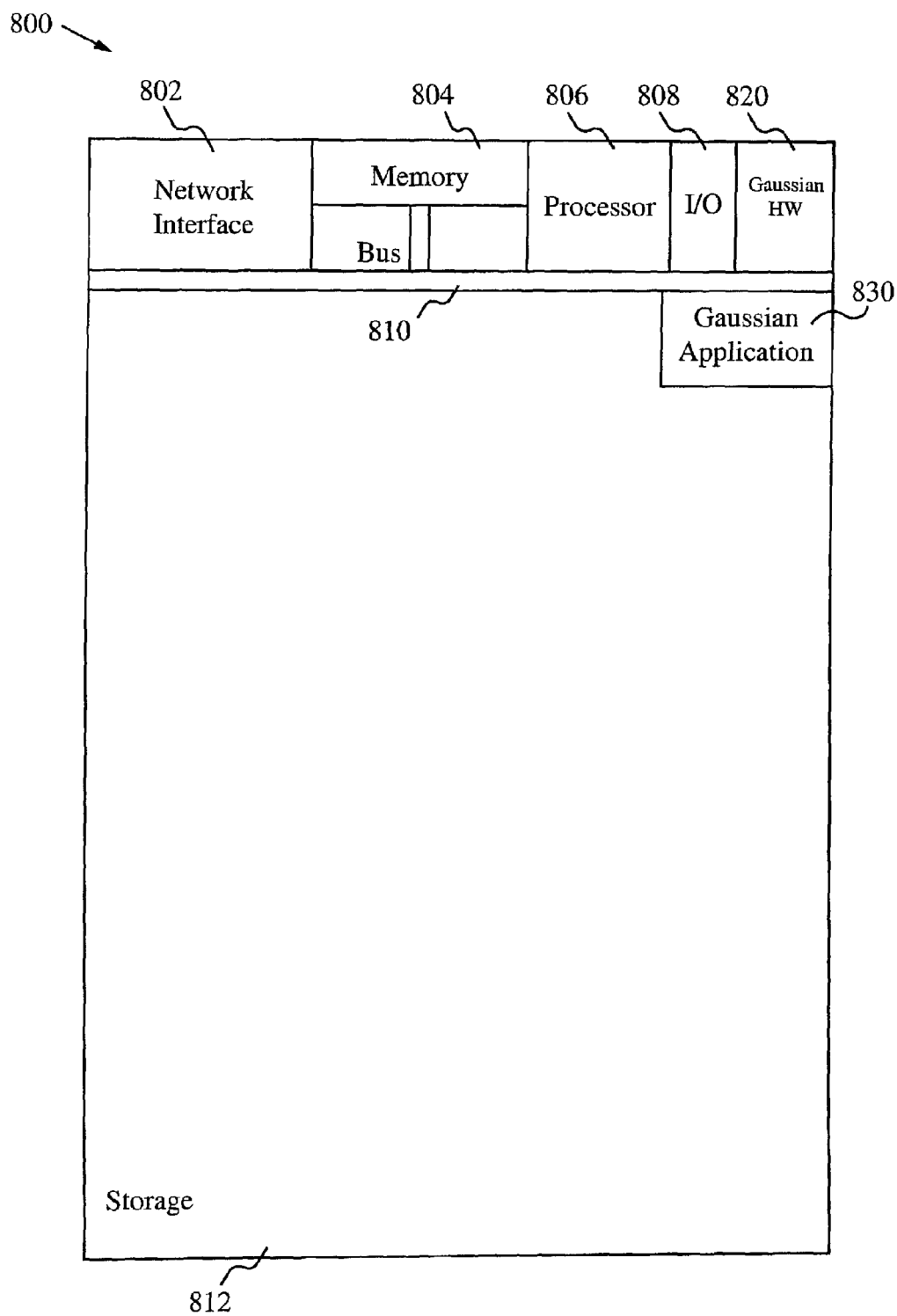
FIG. 8 illustrates a block diagram of an exemplary computing device configured to implement the Gaussian filter according to some embodiments.

FIG. 8 illustrates a block diagram of an exemplary computing device 800 configured to implement the Gaussian filter according to some embodiments. The computing device 800 is able to be used to process information such as images and videos. For example, a computing device 800 is able to filter data of an image. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, display, printer, modem, touchscreen, button interface and other devices. Gaussian filter application(s) 830 used to perform the fast, accurate and efficient Gaussian filter are likely to be stored in the storage device 812 and memory 804 and processed as applications are typically processed. More or less components than shown in FIG. 8 are able to be included in the computing device 800. In some embodiments, Gaussian filter hardware 820 is included. Although the computing device 800 in FIG. 8 includes applications 830 and hardware 820 for fast, accurate and efficient filtering, the Gaussian filter is able to be implemented on a computing device in hardware, firmware, software or any combination thereof.

In some embodiments, the Gaussian filter application(s) 830 include several applications and/or modules. In some embodiments, the Gaussian filter application(s) 830 include modules such as a box filter module for performing the fast implementation of a box filter, repeated convolution module for performing repeated convolution and an overflow computing module for performing overflow computing. In some embodiments, fewer or additional modules and/or sub-modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-Ray® writer/player, a television, a home entertainment system or any other suitable computing device.

To utilize the fast, reliable and accurate Gaussian filter, a user aims a device such as a digital camera at a scene to acquire an image or video of the scene. The Gaussian filter is able to automatically be used with the autofocusing operation to perform the autofocusing quickly and accurately. Then, the user acquires an image or video of the scene. The Gaussian filter is able to be used with other operations as well. The Gaussian filter is also able to be implemented after the image is acquired to perform post-acquisition processing.

In operation, the fast, accurate and efficient Gaussian filter is able to be easily implemented in hardware or software and is highly accurate. The Gaussian filter provides a significant speedup relative to traditional direct convolution. Furthermore, by utilizing overflow computing, hardware requirements are minimized and issues are avoided.

Some Embodiments of a Fast, Accurate and Efficient Gaussian Filter

1. A method of implementing a Gaussian filter programmed in a memory in a device comprising:
    a. implementing a fast convolution with a box filter;
    b. repeating the fast convolution to produce a Gaussian-shaped filter; and
    c. implementing overflow computing to minimize overflow issues.
2. The method of clause 1 wherein a filtered image is generated by applying the Gaussian filter to an image.
3. The method of clause 1 wherein the box filter utilizes four corners of a box for computations.
4. The method of clause 1 wherein the box filter is an arbitrary size.
5. The method of clause 1 wherein the overflow computing utilizes a modulo table by computing a modulo of original data values and using a modulo result in the fast convolution.
6. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
7. A system for implementing a Gaussian filter programmed in a memory in a device comprising:
    a. a box filter module for implementing a fast convolution with a box filter;
    b. a repeated convolution module for repeating the fast convolution to produce a Gaussian-shaped filter; and
    c. a overflow computing module for implementing overflow computing to minimize overflow issues.
8. The system of clause 7 wherein a filtered image is generated by applying the Gaussian filter to an image.
9. The system of clause 7 wherein the box filter utilizes four corners of a box for computations.
10. The system of clause 7 wherein the box filter is an arbitrary size.
11. The system of clause 7 wherein the overflow computing utilizes a modulo table by computing a modulo of original data values and using a modulo result in the fast convolution.
12. The system of clause 7 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
13. A camera device comprising:
    a. an image acquisition component for acquiring an image;
    b. a processing component for processing the image by:
        i. implementing a fast convolution with a box filter;
        ii. repeating the fast convolution to produce a Gaussian-shaped filter; and
        iii. implementing overflow computing to minimize overflow issues; and
    c. a memory for storing the processed image.
14. The camera device of clause 13 wherein a filtered image is generated by applying the Gaussian filter to an image.
15. The camera device of clause 13 wherein the box filter utilizes four corners of a box for computations.
16. The camera device of clause 13 wherein the box filter is an arbitrary size.
17. The camera device of clause 13 wherein the overflow computing utilizes a modulo table by computing a modulo of original data values and using a modulo result in the fast convolution.
18. A method of applying a Gaussian filter to an image programmed in a memory in a device comprising:
    a. implementing a fast convolution with a box filter;
    b. repeating the fast convolution to produce a Gaussian-shaped filter;
    c. implementing overflow computing using a modulo operation to minimize overflow issues; and
    d. generating a filtered image.

19. The method of clause 18 wherein the box filter utilizes four corners of a box for computations.

20. The method of clause 18 wherein the box filter is an arbitrary size.

21. The method of clause 18 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of implementing a Gaussian filter programmed in a memory in a device comprising:
   a. implementing a fast convolution with a box filter;
   b. repeating the fast convolution to produce a Gaussian-shaped filter;
   c. implementing overflow computing to minimize overflow issues; and
   d. autofocusing the Gaussian filter.

2. The method of claim 1 wherein a filtered image is generated by applying the Gaussian filter to an image.

3. The method of claim 1 wherein the box filter utilizes four corners of a box for computations.

4. The method of claim 1 wherein the box filter is an arbitrary size.

5. The method of claim 1 wherein the overflow computing utilizes a modulo table by computing a modulo of original data values and using a modulo result in the fast convolution.

6. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music device, a video player, a DVD writer/player, a high definition video disc writer/player, a television and a home entertainment system.

7. A system for implementing a Gaussian filter comprising:
   a. a memory for storing:
      i. a box filter module configured for implementing a fast convolution with a box filter;
      ii. a repeated convolution module configured for repeating the fast convolution to produce a Gaussian-shaped filter; and
      iii. an overflow computing module configured for implementing overflow computing to minimize overflow issues; and
      iv. autofocusing the Gaussian-shaped filter; and
   b. a processor for processing the memory.

8. The system of claim 7 wherein a filtered image is generated by applying the Gaussian filter to an image.

9. The system of claim 7 wherein the box filter utilizes four corners of a box for computations.

10. The system of claim 7 wherein the box filter is an arbitrary size.

11. The system of claim 7 wherein the overflow computing module utilizes a modulo table by computing a modulo of original data values and using a modulo result in the fast convolution.

12. The system of claim 7 wherein the system is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music device, a video player, a DVD writer/player, a high definition video disc writer/player, a television and a home entertainment system.

13. A camera device comprising:
   a. an image acquisition component for autofocusing to acquire an image;
   b. a processing component for autofocusing and processing the image by:
      i. implementing a fast convolution with a box filter;
      ii. repeating the fast convolution to produce a Gaussian-shaped filter; and
      iii. implementing overflow computing to minimize overflow issues; and
   c. a memory for storing the processed image.

14. The camera device of claim 13 wherein a filtered image is generated by applying the Gaussian filter to an image.

15. The camera device of claim 13 wherein the box filter utilizes four corners of a box for computations.

16. The camera device of claim 13 wherein the box filter is an arbitrary size.

17. The camera device of claim 13 wherein the overflow computing utilizes a modulo table by computing a modulo of original data values and using a modulo result in the fast convolution.

18. A method of applying a Gaussian filter while autofocusing on an image programmed in a memory in a device comprising:
   a. implementing a fast convolution with a box filter;
   b. repeating the fast convolution to produce a Gaussian-shaped filter;
   c. implementing overflow computing using a modulo operation to minimize overflow issues; and
   d. generating a filtered image.

19. The method of claim 18 wherein the box filter utilizes four corners of a box for computations.

20. The method of claim 18 wherein the box filter is an arbitrary size.

21. The method of claim 18 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, an portable music device, a video player, a DVD writer/player, a high definition video disc writer/player, a television and a home entertainment system.

* * * * *